United States Patent [19]
Frerichs et al.

[11] Patent Number: 5,018,565
[45] Date of Patent: May 28, 1991

[54] FILLER RING FOR A VEHICLE WHEEL AND TIRE ASSEMBLY

[75] Inventors: Udo Frerichs, Langenhagen; Eckhard Kuhlmann, Hanover; Heinrich Köhler, Harsum; Axel Metge, Hanover, all of Fed. Rep. of Germany

[73] Assignee: Continental Aktiengesellschaft, Hanover, Fed. Rep. of Germany

[21] Appl. No.: 573,284

[22] Filed: Aug. 24, 1990

Related U.S. Application Data

[63] Continuation-in-part of Ser. No. 347,420, May 4, 1989, abandoned.

[30] Foreign Application Priority Data

May 10, 1988 [DE] Fed. Rep. of Germany ....... 3815926

[51] Int. Cl.$^5$ ............................................. B60C 15/02
[52] U.S. Cl. .................. 152/379.3; 152/380; 152/381.6; 152/DIG. 20
[58] Field of Search .................. 152/379.3, 379.5, 380, 152/381.4, 387, DIG. 20, 379.4, 381.6

[56] References Cited

U.S. PATENT DOCUMENTS 4,791,972 12/1988 Duchow et al. ........... 152/DIG. 20

FOREIGN PATENT DOCUMENTS 0222391 5/1987 European Pat. Off. .... 152/DIG. 20
0236706 9/1987 European Pat. Off. ......... 152/379.3
0271751 6/1988 European Pat. Off. .... 152/DIG. 20
3634678 4/1988 Fed. Rep. of Germany ... 152/379.3

Primary Examiner—Russell D. Stormer
Attorney, Agent, or Firm—Robert W. Becker & Associates

[57] ABSTRACT

A filler ring for a vehicle wheel and pneumatic tire assembly, in which the beads of the tire are mounted on the radially inner periphery of a drop-center wheel rim adjacent essentially radially inwardly extending rim flanges. The filler ring fills a space located between a tire bead and a wall of the drop-center. The filler ring is provided with a plurality of circumferentially extending hollow chambers that are disposed in two planes which are superimposed over one another in a radial direction and are separated from one another via a diagonal rib. Each of the planes of hollow chambers is provided with at least two hollow chambers that are successively arranged in an axial direction. The filler ring has a side wall that rests against a tire bead and extends perpendicular to the axis of rotation, and an oppositely disposed inclined wall that extends at approximately 80° to the axis of rotation. The diagonal rib extends between a radially inner half of the side wall and a radially outer half of the inclined wall. To better prevent shifting of the filler ring radially inwardly, the diagonal rib forms an angle of less than 75°-85° with a radially inner half of the inclined wall.

10 Claims, 1 Drawing Sheet

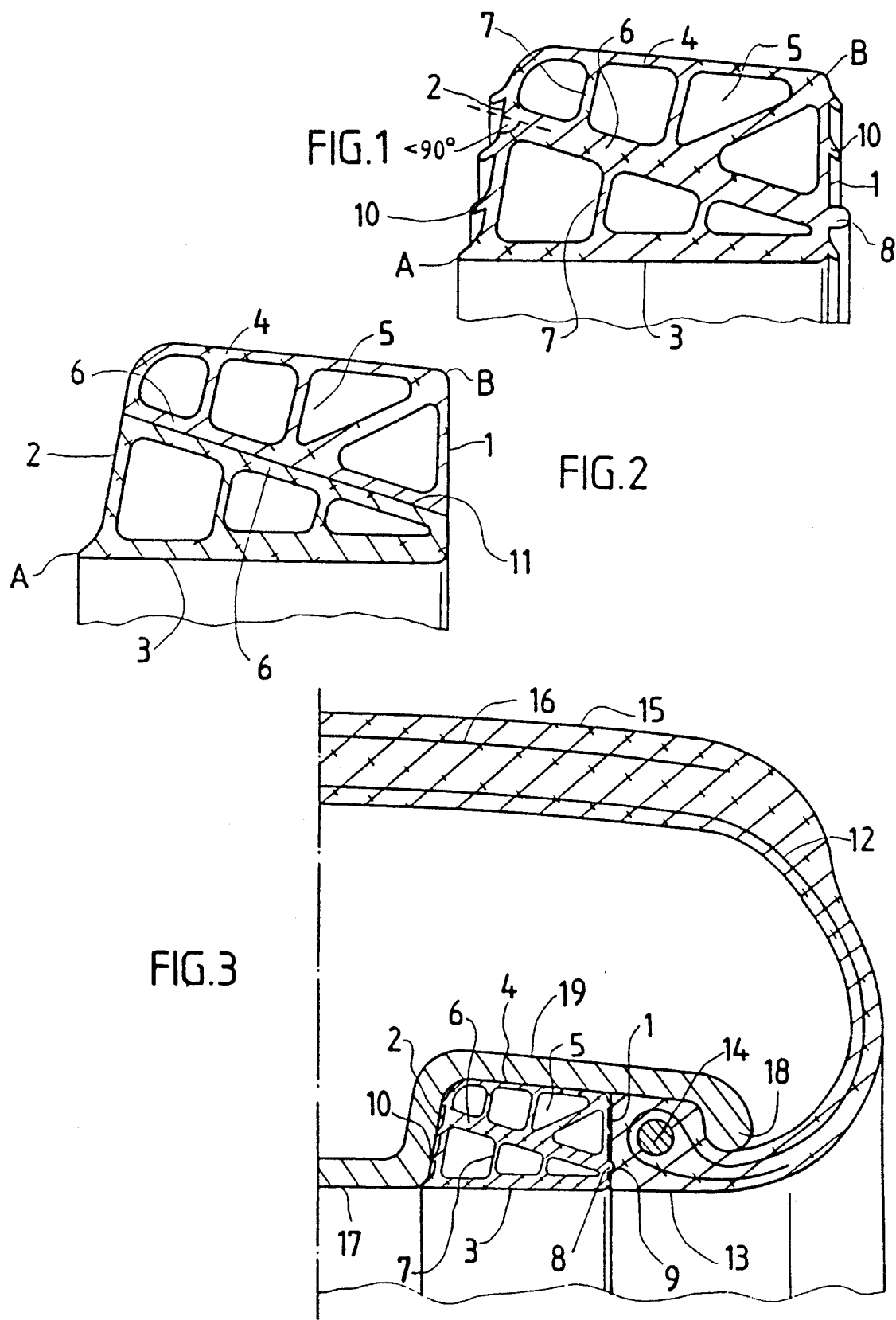

FILLER RING FOR A VEHICLE WHEEL AND TIRE ASSEMBLY

This application is a continuation-in-part of application Ser. No. 347,420 filed May 4, 1989, now abandoned.

BACKGROUND OF THE INVENTION

1. Field of the Invention

The present invention relates to a filler ring of rubber or plastic for a vehicle wheel and pneumatic tire assembly where the beads of the tire are mounted on the radially inner periphery of a drop-center wheel rim adjacent to essentially radially inwardly extending rim flanges. The filler ring fills a space located between a tire bead and a wall of the drop-center, the filler ring being provided with a plurality of circumferentially extending hollow chambers that are disposed in two planes which are superimposed over one another in a radial direction and are separated from one another via a diagonal rib. Each of the planes of hollow chambers is being provided with at least two hollow chambers that are successively arranged in an axial direction, with the filler ring having an axis of rotation, a side wall that rests against a tire bead and extends perpendicular to the axis of rotation, and an oppositely disposed inclined wall that extends at approximately 80° to the axis of rotation. The diagonal rib extends between a radially inner half of the side wall and a radially outer half of the inclined wall.

2. Description of the Prior Art

A filler ring of this general type is known from U.S. Pat. No. 4,791,972, Duchow et al, issued Dec. 20, 1988 and belonging to the assignee of the present invention. This known filler ring not only fulfills the task of completely sealing off a mounting space axially inwardly of the tire beads in such a way that no dirty water or spray can penetrate into this space, but also enables a simpler installation in a vehicle wheel and tire assembly as well as having the characteristic of preventing the filler ring from breaking away radially inwardly during slight movements of the tire bead during extreme driving conditions.

It is an object of the present invention to further improve this last-mentioned feature, namely being able to reliably prevent a shifting of the filler ring in a radially inward direction during extreme driving conditions.

BRIEF DESCRIPTION OF THE DRAWING

This object, and other objects and advantages of the present invention, will appear more clearly from the following specification in conjunction with the accompanying schematic drawing, in which:

FIG. 1 is a partial radial cross-sectional view through one exemplary embodiment of an inventive filler ring having seven circumferential hollow chambers that are disposed in two planes;

FIG. 2 is a partial radial cross-sectional view through another exemplary embodiment of an inventive filler ring that is split into two parts in the region of the diagonal rib, and has circumferential hollow chambers in each of the planes; and FIG. 3 is a partial radial cross-sectional view showing a vehicle wheel and tire assembly in which has been installed an inventive filler ring.

SUMMARY OF THE INVENTION

The filler ring of the present invention is characterized primarily in that the diagonal rib forms an angle of less than 90° with a radially inner half of the inclined wall and preferably forms an angle of 75°–85°, and in particular 75°–λ°.

In order to enable a simplified installation of the filler ring in those cases where relatively little space is provided between the well of the rim and the rim flange, it is proposed that the filler ring be in the form of a two-part ring, with the plane of separation being disposed in the region of the diagonal rib.

As a result of the steep inclination of the diagonal rib, a radial force component is produced when the tire bead exerts forces upon the filler ring. This radial force component is directed radially outwardly, and thus counteracts a migration or shifting of the filler ring in a radially inward direction. Pursuant to a further specific embodiment of the present invention, this effect can be increased still further by providing catch or arresting means on the outer surface of that side wall of the filler ring that rests against a tire bead; an arresting or engagement of the filler ring with the tire bead takes place via this arresting means. Pursuant to another specific embodiment of the present invention, a plurality of circumferential sealing lips are disposed on the outer surface of the filler ring both on the side wall and on the inclined wall; the free ends of these sealing lips extend at an angle radially inwardly.

By splitting the filler ring into two parts in the region of the diagonal rib, there is achieved the advantage of a considerably simplified installation, because the radial dimension of the cross-sectional configuration of the filler ring is cut practically in half, and in a very straightforward manner first the outer half of the filler ring is installed, and subsequently the inner half is inserted.

Further specific features of the present invention will be described in detail subsequently.

DESCRIPTION OF PREFERRED EMBODIMENTS

Referring now to the drawing in detail, the filler ring illustrated in FIG. 1 is provided with a side wall 1 that extends perpendicularly or at right angles to the axis of rotation thereof; after installation, the filler ring rests against a tire bead. The opposite inclined wall 2 is inclined at an angle of approximately 10° relative to a line that extends perpendicular to said axis of rotation, with this angle of inclination being in conformity with the inclination of the wall of a drop-center rim.

The radially inner wall 3 of the filler ring extends essentially parallel to the axis of rotation, whereas the radially outer wall 4 extends at an angle thereto, so that in the region that faces the drop center of the rim, the wall 4 forms the greatest filler ring diameter. In filler rings for passenger automobile tires the angle of inclination of the wall 4 is exactly 5°. The annular or circumferential hollow chambers 5 are disposed in two planes, with four hollow chambers being disposed in the upper or radially outermost plane, and three hollow chambers being disposed in the lower or radially innermost plane. The two planes are separated from one another by an inner wall that is in the form of a diagonal rib 6.

The diagonal rib 6 extends from the radially inner half of the side wall 1 to the radially outer half of the inclined wall 2. The diagonal rib 6 is inclined to such an extent that it forms with the inclined wall 2 an angle of less than 90°, preferably 75° to 85° and in particular 75°-80°. In filler rings for passenger automobile tires, the diagonal rib 6 has a thickness of 2 to 4 mm, preferably approximately 3 mm.

The hollow chambers 5 disposed in a given plane are separated from one another by narrow or thin partitions that are in the form of transverse ribs 7 (these ribs extend essentially perpendicular to the diagonal rib 6), with the partitions 7 in one plane being offset from the partitions in the other plane. As a result, the unsupported or effective lengths of the diagonal rib 6 are reduced to such a small length that the inventive effect is improved even further due to the steep inclination of the rib 6. The filler ring illustrated in FIG. 1 is optimized pursuant to the finite elements method, with the essential point being that the locations A and B are softer or more yielding than the other two edges to facilitate installation. In addition to the cross-sectional contour illustrated in FIG. 1, this is primarily achieved by making the outer walls 1, 2, and 4, as well as the partitions 7, very thin (with a thickness of approximately 1-2 mm), whereas the walls 3 and 6 should have a thickness of approximately 3 mm, however with the exception that the wall 3 should have a thickness of approximately 2 mm along the length of the axially and radially inner hollow chamber 5.

As a catching or arresting means, the filler ring illustrated in FIG. 1 is provided on the outer side of the side wall 1 with a circumferential rib 8 that for the purpose of locking or engaging with a tire bead after the filler ring is installed extends into a corresponding groove 9 of the bead (see FIG. 3). It is to be understood that if necessary, the relationship could also be reversed, in other words, a rib on the bead would extend into a groove on the filler ring. Finally, the filler ring of FIG. 1 is also provided with several inclined sealing lips 10 that are disposed on the perpendicular side wall 1 and on the inclined wall 2. The purpose of the sealing lips 10 is to completely retain the sealing function even when the filler ring is shifted slightly. Expediently, three or four sealing lips 10 are provided on each of the walls 1, 2.

The filler ring illustrated in FIG. 2 is distinguished by a bisecting or splitting along the line 11, which approximately represents the center line of the diagonal rib 6. In other respects, except for the rib 8 and the sealing lips 10, the filler ring of FIG. 2 has a structure similar to that of the embodiment of FIG. 1. Due to the splitting, a much simpler mounting is provided for those cases where the free installation height between the rim flange and the rim well is particularly small.

The partial radial cross-sectional view of FIG. 3 shows a vehicle wheel and tire assembly in which the filler ring of FIG. 1 is installed. The pneumatic vehicle tire, which is comprised of rubber or rubber-like synthetic material, has a carcass 12 that is anchored in the beads 13 by being looped about inextensible and compression-resistant bead cores 14. A conventional reinforcing belt 16 is disposed between the tread 15 and the carcass 12. The tire beads 13 are disposed on the radially inner periphery of a drop-center rim 17 next to rim flanges 18 that extend essentially radially inwardly. Those portions 19 of the rim 17 that are disposed axially inwardly of and adjacent to the rim flanges 18 serve as emergency support surfaces to support the tire in the event of a tire failure or loss of pressure. The rim portion 19 extends at an angle in the transverse direction, so that a recessed mounting portion is formed for the tire on the radially inner side of the rim next to the tire beads 13.

After the tire has been mounted on the one-piece rim 17, the space next to the tire beads 13, which includes the recessed mounting portion, is closed off or filled by a filler ring of the aforementioned type, so that no dirty water or spray can enter this space.

The filler rings that have been described are preferably made of a rubber having a Shore A hardness of between 80 and 90, and having an elongation at break of greater than 250% pursuant to DIN (German Industrial Norm) 53504. The material density should be approximately 1.40 g/cm$^3$.

The present invention is, of course, in no way restricted to the specific disclosure of the specification and drawing, but also encompasses any modifications within the scope of the appended claims.

What we claim is:

1. In a filler ring of rubber or plastic for a vehicle wheel and pneumatic tire assembly where the beads of the tire are mounted on the radially inner periphery of a drop-center wheel rim adjacent essentially radially inwardly extending rim flanges, with said filler ring filling a space located between a tire bead and a wall of said drop-center wheel rim adjacent to said essentially radially inwardly extending rim flanges, said filler ring being provided with a plurality of circumferentially extending hollow chambers that are disposed in two planes which are superimposed over one another in a radial direction and are separated from one another via a diagonal rib, with each of said planes of hollow chambers being provided with at least two hollow chambers that are successively arranged in an axial direction, with said filler ring having an axis of rotation, a side wall that rests against a tire bead and extends perpendicular to said axis or rotation, and an oppositely disposed inclined wall that extends at approximately 80° to said axis of rotation, and with said diagonal rib extending between a radially inner half of said side wall and a radially out half of said inclined wall, comprising the improvement wherein:

said diagonal rib specifically has a steep inclination at an angle of 75 to 80 with a radially inner half of said inclined wall, and including transverse ribs offset in different planes and extending essentially perpendicular to said diagonal rib so that effective lengths of said diagonal rib are reduced to such a small length and further as a result of the steep inclination of said diagonal rib directly a radial force component is produced when the tire bead exerts forces upon the filler ring, said radial force component being directed radially outwardly, and thus counteracting migratory shifting of the filler ring in a radially inward direction.

2. A filler ring according to claim 1, in which said transverse ribs extend from opposite sides of said diagonal rib and form partitions between respective ones of said hollow chambers, with said transverse ribs in one of said planes of said hollow chambers being offset relative to said transverse ribs in the other of said planes of said hollow chambers.

3. A filler ring according to claim 1, in which said diagonal rib has a thickness of from 2 to 4 mm.

4. A filler ring according to claim 1 in which the radially innermost one of said planes of said hollow chambers includes three hollow chambers, and the radially outermost one of said planes of said hollow chambers includes three hollow chambers.

5. A filler ring according to claim 1, in which the radially innermost one of said planes of said hollow chambers includes three hollow chambers, and the radially outermost one of said planes of said hollow chambers includes four hollow chambers.

6. A filler ring according to claim 1, in which said side wall has an outer surface that is provided with arresting means for engaging an adjacent tire bead.

7. A filler ring according to claim 6, in which said arresting means is in the form of a circumferential rib, and in which the pertaining tire bead is provided with a corresponding groove.

8. A filler ring according to claim 1, in which said side wall and said inclined wall have respective outer surfaces that are each provided with at least one sealing lip.

9. A filler ring according to claim 1, which is in the form of a two-part ring having a plane of separation disposed in said diagonal rib.

10. A filler ring according to claim 1, in which said diagonal rib forms an angle of 75°-80° with said radially inner half of said inclined wall.

* * * * *